(12) United States Patent
Kanbara et al.

(10) Patent No.: US 10,253,204 B2
(45) Date of Patent: Apr. 9, 2019

(54) ACTIVE ENERGY BEAM-CURABLE RESIN COMPOSITION, RESIN MOLDING, AND METHOD FOR PRODUCING RESIN MOLDING

(71) Applicant: Mitsubishi Rayon Co., Ltd., Tokyo (JP)

(72) Inventors: Riina Kanbara, Toyohashi (JP); Hiroyuki Satou, Tokyo (JP); Kazuyoshi Odaka, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 35 days.

(21) Appl. No.: 15/305,408

(22) PCT Filed: Apr. 20, 2015

(86) PCT No.: PCT/JP2015/061960
§ 371 (c)(1),
(2) Date: Oct. 20, 2016

(87) PCT Pub. No.: WO2015/163274
PCT Pub. Date: Oct. 29, 2015

(65) Prior Publication Data
US 2017/0044395 A1 Feb. 16, 2017

(30) Foreign Application Priority Data
Apr. 22, 2014 (JP) .................................. 2014-087988

(51) Int. Cl.
| C09D 151/08 | (2006.01) |
| C09D 5/00 | (2006.01) |
| F21S 8/10 | (2006.01) |
| B05D 3/06 | (2006.01) |
| C08F 290/06 | (2006.01) |
| C08J 7/18 | (2006.01) |
| F21V 5/00 | (2018.01) |
| F21S 43/00 | (2018.01) |
| F21S 41/20 | (2018.01) |

(52) U.S. Cl.
CPC ........... C09D 151/08 (2013.01); B05D 3/067 (2013.01); C08F 290/061 (2013.01); C08F 290/067 (2013.01); C08J 7/18 (2013.01); C09D 5/00 (2013.01); F21S 41/20 (2018.01); F21S 43/00 (2018.01); F21V 5/00 (2013.01); C08J 2369/00 (2013.01); C08J 2451/08 (2013.01)

(58) Field of Classification Search
CPC ................ C08F 222/10; C08F 290/061; C08F 290/067; B05D 3/067; C08J 2367/00; C08J 2451/08; C08J 7/18; C09D 151/08; C09D 5/00; F21S 41/20; F21S 43/00; F21V 5/00

USPC ................ 528/392; 428/423.1, 500; 427/331
See application file for complete search history.

(56) References Cited

U.S. PATENT DOCUMENTS

2009/0111904 A1 4/2009 Odaka et al.

FOREIGN PATENT DOCUMENTS

| EP | 1559718 A1 | 8/2005 |
| JP | S56-122840 A | 9/1981 |
| JP | H05-179157 A | 7/1993 |
| JP | H05-230397 A | 9/1993 |
| JP | H06-128502 A | 5/1994 |
| JP | 2000-063701 A | 2/2000 |
| JP | 2002-348499 A | 12/2002 |
| JP | 2004217809 A * | 8/2004 |
| JP | 2007-030479 A | 2/2007 |
| JP | 2007-314769 A | 12/2007 |

(Continued)

OTHER PUBLICATIONS

Extended European Search Report issued in corresponding European Patent Application No. 15783379.9 dated Mar. 7, 2017.
International Search Report issued in corresponding International Patent Application No. PCT/JP2015/061960 dated Jul. 14, 2015.
Office Action issued in counterpart Japanese Patent Application No. 2015-522819 dated Jul. 24, 2018.

(Continued)

*Primary Examiner* — Thao T Tran
(74) *Attorney, Agent, or Firm* — Morgan, Lewis & Bockius LLP

(57) ABSTRACT

Provided are: a resin composition with which it is possible to form a cured film having excellent weather resistance and wear resistance; and a resin molding having said cured film. An active energy beam-curable resin composition containing a radical polymerizable compound and a photopolymerization initiator (d), wherein said radical polymerizable compound contains 57-90 mass % of (a) caprolactone-modified mono- or poly-penta erythritol poly (meth)acrylate represented by formula (1) and 10-43 mass % of (b) urethane (meth)acrylate synthesized from a polycarbonate polyol having a branched alkyl structure and an average molecular weight falling within the range of 500-1000, a diisocyanate having an alicyclic structure, and a mono (meth)acrylate containing a hydroxyl group. In formula (1), each X independently represents a caprolactone-modified (meth)acryloyl group, a (meth)acryloyloxy group, or a —OH group.

$$\text{X}-\text{H}_2\text{C}-\underset{\underset{\text{X}}{|}}{\overset{\overset{\text{H}_2\text{C}-\text{X}}{|}}{\text{C}}}-\overset{\text{H}_2}{\text{C}}-\left(\text{O}-\overset{\text{H}_2}{\text{C}}-\underset{\underset{\text{X}}{|}}{\overset{\overset{\text{CH}_2-\text{X}}{|}}{\text{C}}}-\overset{\text{H}_2}{\text{C}}\right)_n-\text{X} \quad (1)$$

16 Claims, No Drawings

(56) References Cited

FOREIGN PATENT DOCUMENTS

| | | | |
|---|---|---|---|
| JP | 2007-314770 | A | 12/2007 |
| JP | 2009-215452 | A | 9/2009 |
| JP | 2010-111810 | A | 5/2010 |
| JP | 2012-229331 | A | 11/2012 |
| JP | 2013-119559 | A | 6/2013 |
| WO | 2014/004596 | A1 | 1/2014 |

OTHER PUBLICATIONS

Office Action issued in counterpart Japanese Patent Application No. 2015-522819 dated Jan. 29, 2019.

* cited by examiner

ACTIVE ENERGY BEAM-CURABLE RESIN COMPOSITION, RESIN MOLDING, AND METHOD FOR PRODUCING RESIN MOLDING

TECHNICAL FIELD

The present invention relates to a resin composition that can be cured by irradiation with an active energy beam, the resin composition being capable of forming a cured film on the surface of a base material such as a resin molded article. Furthermore, the present invention also relates to a resin molded article having the relevant cured film formed thereon, and a method for producing the relevant resin molded article.

BACKGROUND ART

Resin molded articles produced from a polymethyl methacrylate resin, a polymethacrylimide resin, a polycarbonate resin, a polystyrene resin, an acrylonitrile-styrene resin and the like are lightweight, have excellent impact resistance, and also have satisfactory transparency. These resins are used as the materials for the members of automotive use, such as various lamp lenses, glazings, and covers for gauges. Particularly, in regard to headlamp lenses for automotive use, resin molded articles are used in order to cope with weight reduction of cars and diversification of car design. However, since resin molded articles lack abrasion resistance, those articles are susceptible to damage on the surface as a result of contact with other hard objects, friction, scratching and the like, and damaged surfaces lower the product values. Furthermore, in regard to members for automotive use, weather resistance is also an important performance factor. Particularly, a polycarbonate resin has low weather resistance, and undergoes significant yellowing or cracking on the surface of a resin molded article, owing to ultraviolet radiation.

Regarding a method for ameliorating the defects of such a resin molded article, there is available a method of applying a resin composition including a radical polymerizable compound, irradiating the resin composition with an active energy beam, and thereby forming a cured film (Patent Literature 1 to Patent Literature 6). Furthermore, it is known that a laminate having a resin layer that is obtainable by irradiating a composition including a urethane (meth)acrylate compound obtained from a polycarbonate polyol having a branched alkyl structure as a raw material, with an active energy beam, and thereby curing the composition, exhibits excellent strength and elongation in a tensile test (Patent Literature 7).

CITATION LIST

Patent Literature

Patent Literature 1: JP 56-122840 A
Patent Literature 2: JP 05-230397 A
Patent Literature 3: JP 06-128502 A
Patent Literature 4: JP 05-179157 A
Patent Literature 5: JP 2000-63701 A
Patent Literature 6: JP 2002-348499 A
Patent Literature 7: JP 2007-30479 A

SUMMARY OF THE INVENTION

Problem to be Solved by the Invention

However, some of the cured films obtainable from conventional active energy beam-curable resin compositions have insufficient abrasion resistance and weather resistance. It is an object of the present invention to provide an active energy beam-curable resin composition capable of forming a cured film having excellent weather resistance and abrasion resistance, a resin molded article having formed thereon a cured film obtained by curing the resin composition, and a method for producing the relevant resin molded article.

Means for Solving Problem

The problems described above are addressed by any one of the following inventions [1] to [9].

[1] An active energy beam-curable resin composition comprising radical polymerizable compounds and (d) a photopolymerizable initiator, wherein the radical polymerizable compounds include, based on a total amount of 100% by mass of the radical polymerizable compounds, 57% to 90% by mass of (a) a caprolactone-modified mono- or poly-pentaelythritol poly(meth)acrylate represented by the following formula (1); and 10% to 43% by mass of (b) a urethane (meth)acrylate synthesized from a polycarbonate polyol having a branched alkyl structure and having a number average molecular weight in the range of 500 to 1,000, a diisocyanate having an alicyclic structure, and a mono(meth)acrylate containing a hydroxyl group:

[Chem. 1]

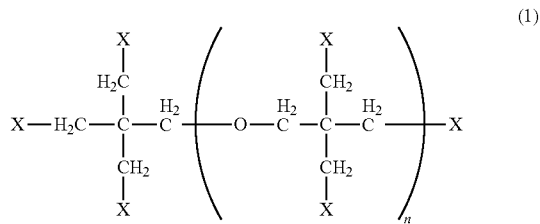

wherein in formula (1), "4+2n" units of X each independently represent a (meth)acryloyl group modified by caprolactone $(CH_2\!=\!CR\!-\!CO(O(CH_2)_5C\!=\!O)_y\!-\!)$ (wherein R represents a hydrogen atom or a methyl group; and y represents an integer from 1 to 5), a (meth)acryloyloxy group $(CH_2\!=\!CR\!-\!COO\!-\!)$ (wherein R represents a hydrogen atom or a methyl group), or a —OH group; at least one X represents a (meth)acryloyl group modified by caprolactone, each of at least two X's represents a (meth)acryloyloxy group, while each of the other X's represents a —OH group; and n represents an integer from 0 to 4.

[2] The active energy beam-curable resin composition according to [1], wherein the radical polymerizable compounds further include, based on a total amount of 100% by mass of the radical polymerizable compounds, 7% by mass or less of (c) a radical polymerizable monomer other than the (a) mono- or poly-pentaerythritol poly(meth)acrylate and the (b) urethane (meth)acrylate, the (c) radical polymerizable monomer being crystallizable at a temperature of 25° C.

[3] The active energy beam-curable resin composition according to [1] or [2], wherein the active energy beam-curable resin composition further includes (e) an ultraviolet absorber in an amount of 0.5 to 20 parts by mass relative to a total amount of 100 parts by mass of the radical polymerizable compounds.

[4] The active energy beam-curable resin composition according to [3], wherein the (e) ultraviolet absorber has a molecular weight of 500 or more.

[5] The active energy beam-curable resin composition according to [3], wherein the (e) ultraviolet absorber is a combination of two or more kinds of ultraviolet absorber each having a molecular weight of 500 or more.

[6] The active energy beam-curable resin composition according to any one of [1] to [5], wherein the active energy beam-curable resin composition further includes (f) a hindered amine-based photostabilizer in an amount of 0.1 to 5 parts by mass relative to a total amount of 100 parts by mass of the radical polymerizable compounds.

[7] A resin molded article having formed on the surface of the resin molded article, a cured film obtained by curing the active energy beam-curable resin composition according to any one of [1] to [6].

[8] The resin molded article according to [7], wherein the resin molded article is a headlamp lens for automotive use.

[9] A method for producing the resin molded article according to [7] or [8], the method including applying the active energy beam-curable resin composition according to any one of [1] to [6] on the surface of a resin molded article, and irradiating the coating film thus obtained with an active energy beam.

Effect of the Invention

The active energy beam-curable resin composition of the present invention is capable of forming a cured film having excellent weather resistance and abrasion resistance. The resin molded article of the present invention has excellent weather resistance and abrasion resistance. According to the method for producing a resin molded article of the present invention, a resin molded article having excellent weather resistance and abrasion resistance can be obtained.

MODE(S) FOR CARRYING OUT THE INVENTION

First, the various components of the resin composition of the present invention will be described. In the following description, the (a) mono- or poly-pentaerythritol poly (meth)acrylate, (b) urethane (meth)acrylate, (c) radical polymerizable monomer, (d) photopolymerizable initiator, (e) ultraviolet absorber, and (f) hindered amine-based photostabilizer mentioned above may be referred to as component (a), component (b), component (c), component (d), component (e), and component (f), respectively. Furthermore, the term "(meth)acrylate" according to the present invention means "acrylate" or "methacrylate"; the term "(meth)acryloyl group" means "acryloyl group" or "methacryloyl group"; and the term "(meth)acryloyloxy group" means "acryloyloxy group" or "methacryloyloxy group".

<Component (a)>

The active energy beam-curable resin composition of the present invention includes, as a radical polymerizable compound, (a) a caprolactone-modified mono- or poly-pentaerythritol poly(meth)acrylate represented by formula (1) described above.

When the component (a) is used, the resin composition exhibits satisfactory polymerization activity when irradiated with an active energy beam, and can produce a polymer having a high crosslinking density and excellent abrasion resistance. Therefore, a cured film having excellent abrasion resistance can be formed on the surface of a base material.

A specific example of the component (a) may be a compound in which a (meth)acryloyl group of a mono- or poly-pentaerythritol poly(meth)acrylate has been modified by caprolactone. Examples of pentaerythritol poly(meth) acrylate include the following: pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, tripentaerythritol tetra(meth)acrylate, tripentaerythritol penta(meth)acrylate, tripentaerythritol hexa(meth)acrylate, tripentaerythritol hepta(meth)acrylate, and tripetnaerythritol octa(meth)acrylate. Here, the mono- or poly-pentaerythritol poly(meth)acrylate is preferably poly-pentaerythritol poly(meth)acrylate from the viewpoint of weather resistance of the cured film, and dipentaerythritol poly(meth)acrylate is more preferred. The diepentaerythritol poly(meth)acrylate is preferably dipentaerythritol penta(meth)acrylate or dipentaerythritol hexa(meth)acrylate from the viewpoint of weather resistance of the cured film, and dipentaerythritol hexa(meth)acrylate is more preferred. Furthermore, the mono- or poly-pentaerythritol poly(meth) acrylate is preferably mono- or poly-pentaerythritol polyacrylate from the viewpoint of curability.

In regard to formula (1), from the viewpoint of abrasion resistance of the cured film, y of the caprolactone-modified (meth)acryloyl group $(CH_2=CR-CO(O(CH_2)_5C=O)_y-)$ is preferably 4 or less, more preferably 3 or less, even more preferably 2 or less, and particularly preferably 1. Furthermore, the number of the caprolactone-modified (meth)acryloyl groups is one or more and "2n+2" or less as an average per molecule of the component (a); however, the lower limit is preferably 2 or more from the viewpoint of weather resistance of the cured film. Furthermore, the upper limit is preferably "2n+1", and more preferably 2n, from the viewpoints of scratch resistance and the degree of yellowing of the cured film.

The mixing amount of the component (a) in the resin composition of the present invention is 57% to 90% by mass based on a total amount of 100% by mass of the radical polymerizable compounds. The lower limit of the range is preferably 65% by mass or more, and more preferably 71% by mass or more. Furthermore, the upper limit of the range is preferably 85% by mass or less, and more preferably 80% by mass or less. As the mixing amount of the component (a) is larger, the abrasion resistance of the cured film is enhanced. Furthermore, as the mixing amount of the component (a) is smaller, the weather resistance and heat resistance of the cured film are enhanced.

<Component (b)>

The active energy beam-curable resin composition of the present invention includes, as a radical polymerizable compound, (b) a urethane (meth)acrylate synthesized from (b1) a polycarbonate polyol having a branched alkyl structure and having a number average molecular weight in the range of 500 to 1,000, (b2) a diisocyanate having an alicyclic structure, and (b3) a mono(meth)acrylate containing a hydroxyl group. When this component (b) is used, toughness can be imparted to the cured film of the resin composition, and weather resistance of the cured film can be increased.

The (b1) polycarbonate polyol, which is a first raw material of the component (b), has a branched alkyl structure. Due to the raw material (b1), even in a case in which the solid content concentration is high, the resin composition has enhanced storage stability, and flexibility of the cured film obtainable from the resin composition is increased. The number average molecular weight of this polycarbonate polyol is in the range of 500 to 1,000. When the number average molecular weight is 500 or more, weather resistance of the cured film obtainable from the resin composition is enhanced. Furthermore, when the number average molecular weight is 1,000 or less, abrasion resistance of the cured film is enhanced. Meanwhile, this number average molecular weight can be calculated by the following expression, from the hydroxyl group value and the number of hydroxyl groups in one molecule of the alcohol, which is a constituent component of the polycarbonate polyol.

$$\text{Number average molecular weight}=(56.11\times N/[\text{hydroxyl group value}])\times 1000$$

provided that N represents the number of hydroxyl groups contained in one molecule of the alcohol component.

Such a polycarbonate polyol can be synthesized by, for example, a transesterification reaction between a polyhydric alcohol having a branched alkyl structure and a carbonic acid ester.

The polyhydric alcohol having a branched alkyl structure is preferably a dihydric alcohol from the viewpoint of the reactivity for transesterification. The branched alkyl structure of the polyhydric alcohol is preferably a structure having a side chain of a linear alkyl in the main chain of a linear alkyl, from the viewpoint of the reactivity for transesterification. The number of carbon atoms of the main chain of the branched alkyl structure is preferably 3 to 15, and more preferably 5 to 8, from the viewpoint of scratch resistance of the cured film. Furthermore, the number of carbon atoms of the side chain of the branched alkyl structure is preferably 1 to 10, and more preferably 1 to 3, from the viewpoint of reactivity. Specific preferred examples of the polyhydric alcohol having a branched alkyl structure include 3-methyl-1,5-pentanediol, neopentyl glycol, 2-ethyl-1,3-hexanediol, and 2-methyl-1,8-octanediol.

Examples of the carbonic acid ester include the following: cyclic carbonates such as ethylene carbonate; dialkyl carbonates such as dimethyl carbonate, diethyl carbonate, di-n-propyl carbonate, diisopropyl carbonate, dibutyl carbonate, and dicyclohexyl carbonate; and dialyl carbonates such as diphenyl carbonate. The carbonic acid ester is preferably a dialkyl carbonate from the viewpoint of weather resistance of the cured film.

Regarding this polycarbonate polyol, a commercially available product can also be used. Specifically, examples of a commercially available product of a polycarbonate polyol having a branched alkyl structure and a number average molecular weight in the range of 500 to 1,000 include the following: trade names: KURARAY POLYOL C-590 (number average molecular weight 500), KURARAY POLYOL C-770 (number average molecular weight 800), KURARAY POLYOL C-1050 (number average molecular weight 1,000), KURARAY POLYOL C-1090 (number average molecular weight 1,000), KURARAY POLYOL C1065N (number average molecular weight 1,000), and KURARAY POLYOL C-1015N (number average molecular weight 1,000), all manufactured by Kuraray Co., Ltd.

The (b2) diisocyanate, which is a second raw material of the component (b), has an alicyclic structure. Due to the raw material (b2), the cured film obtainable from the resin composition acquires both excellent weather resistance and excellent abrasion resistance. The diisocyanate is preferably a compound having a cyclohexane structure, such as dicyclohexylmethane-4,4'-diisocyanate, methylcyclohexane-2,4-diisocyanate, methylcyclohexane-2,6-diisocyanate, 1,3-bis(isocyanatomethyl)cyclohexane, and isophorone diisocyanate, from the viewpoint of weather resistance of the cured film.

The mono(meth)acrylate (b3) containing a hydroxyl group, which is a third raw material of the component (b), is a compound having one (meth)acryloyl group in one molecule. Due to the raw material (b3), flexibility of the cured film obtainable from the resin composition is enhanced. Furthermore, compared to a case in which a (meth)acrylate having two or more (meth)acryloyl groups in one molecule is used, the resin composition has excellent storage stability, and the cured film obtainable from the resin composition has excellent weather resistance. Specific examples of this mono(meth)acrylate include the following compounds: hydroxyalkyl (meth)acrylates such as 2-hydroxyethyl (meth)acrylate, 2-hydroxypropyl (meth)acrylate, and 4-hydroxybutyl (meth)acrylate; addition reaction products between monoepoxy compounds and (meth)acrylic acid, such as butyl glycidyl ether and 2-ethylhexyl glycidyl ether; mono(meth)acrylic acid esters of polyethylene glycol or polypropylene glycol; and mono(meth)acrylic acid esters of polycaprolactone diol. From the viewpoint of scratch resistance of the cured film, a hydroxyalkyl (meth)acrylate is preferred, a hydroxyalkyl (meth)acrylate having a hydroxyalkyl moiety with 2 to 4 carbon atoms is more preferred, and 2-hydroxyethyl (meth)acrylate is particularly preferred.

Regarding the method for producing the component (b), for example, there is available a method of reacting the three kinds of raw materials described above, in the presence of a catalyst that reacts an isocyanate group with a hydroxyl group and forms a urethane bond. It is preferable to adjust the mixing ratio of the three kinds of raw materials such that the isocyanate groups and the hydroxyl groups exist in almost equimolar amounts, from the viewpoint of stably producing the reaction product. The reaction temperature for the urethanization reaction is preferably 60° C. to 70° C., and the reaction time is preferably 1 to 20 hours. The catalyst is preferably di-n-butyltin dilaurate. Since many of the reaction products generally become highly viscous, it is preferable to dilute the reaction product with an organic solvent or another diluent monomer during the reaction or after completion of the reaction.

The mixing amount of the component (b) in the resin composition of the present invention is 10% to 43% by mass based on a total amount of 100% by mass of the radical polymerizable compounds. Furthermore, the lower limit of the range is preferably 15% by mass or more, and the upper limit is preferably 29% by mass or less. As the mixing amount of the component (b) is larger, the weather resistance of the cured film and the curability of the resin composition in an air atmosphere are enhanced. Furthermore, as the mixing amount of the component (b) is smaller, abrasion resistance of the cured film is increased.

<Component (c)>

The active energy beam-curable resin composition of the present invention may also include component (c), which is a radical polymerizable monomer other than the component (a) and the component (b) and is capable of crystallizing at a temperature of 25° C., as an optional component in addition to the component (a) and component (b) described above as radical polymerizable compounds. The presence or absence of crystallization at a temperature of 25° C. can be determined by the following method. That is, the external appearance of a compound that has been stored at a temperature of 25° C. for 10 days is evaluated by visual inspection, and thus the presence or absence of a crystalline component is determined.

The mixing amount of the component (c) in the rein composition is preferably 7& by mass or less, more preferably 5% by mass or less, even more preferably 3% by mass or less, particularly preferably 1% by mass or less, and most preferably 0% by mass, based on a total amount of 100% by mass of the radical polymerizable compounds. When the mixing amount of the component (c) is reduced, even in a case in which the solid content concentration of the resin composition is high, storage stability of the resin composition is enhanced.

Specific examples of the component (c) include the following compounds: isocyanurates such as bis(2-acryloyloxyethyl)hydroxyethyl isocyanurate, tris(2-acryloyloxyethyl) isocyanurate, bis(2-acryloyoxypropyfihydroxyethyl isocyanurate, and tris(2-acryloyloxypropyl) isocyanurate; stearyl acrylate, 1-adamantyl acrylate, and pentaerythritol tetraacrylate.

<Component (d)>

The (d) photopolymerizable initiator is a compound capable of initiating polymerization of a (meth)acrylic monomer or oligomer when irradiated with an active energy beam.

Specific examples of the component (d) include the following compounds: carbonyl compounds such as benzoin, benzoin monomethyl ether, benzoin isopropyl ether, acetoin, benzil, benzophenone, p-methoxybenzophenone, diethoxyacetophenone, benzyl dimethyl ketal, 2,2-diethoxyacetophenone, 1-hydroxycyclohexyl phenyl ketone, methyl phenyl glyoxylate, ethyl phenyl glyoxylate, 2-hydroxy-2-methyl-1-phenylpropan-1-one, and 2-hydroxy-1-[4-{4-(2-hydroxy-2-methylpropionyfibenzyl}phenyl]-2-methylpropan-1-one; sulfur compounds such as tetramethylthiuram mono sulfide and tetramethylthiuram disulfide; and acylphosphine oxides such as 2,4,6-trimethylbenzoyklipheny1-phosphine oxide. These are used singly or in combination of two or more kinds thereof. Among these, benzophenone, benzoin isopropyl ether, methyl phenyl glyoxylate, and benzyl dimethyl ketal are more preferred.

The mixing amount of the component (d) in the resin composition of the present invention is preferably 0.1 to 10 parts by mass relative to a total amount of 100 parts by mass of the radical polymerizable compounds. Furthermore, the lower limit of the range is more preferably 1 part by mass or more, and the upper limit is more preferably 5 parts by mass or less. As the mixing amount of the component (d) is larger, curability of the resin composition is enhanced, and as the mixing amount of the component (d) is smaller, transparency and weather resistance of the cured film are enhanced.

<Component (e)>

It is preferable that the resin composition of the present invention further includes (e) an ultraviolet absorber. The component (e) is preferably a compound having a molecular weight of 500 or more from the viewpoint of heat resistance of the resin molded article. From the viewpoint of having satisfactory solubility in the resin composition and improving weather resistance of a resin molded article that has a cured film of the present invention formed thereon, the component (e) is preferably an ultraviolet absorber which is derived from a triazine-based, benzophenone-based, benzotriazole-based, phenyl salicylate-based, or phenyl benzoate-based compound, and has a maximum absorption wavelength in the range of 240 to 380 nm. From the viewpoint of incorporating the ultraviolet absorber in a large amount into the resin composition, a benzophenone-based ultraviolet absorber is preferred. Furthermore, from the viewpoint of preventing yellowing of a base material such as polycarbonate, a triazine-based or benzotriazole-based ultraviolet absorber is preferred.

Specific examples of the component (e) include the following compounds: triazine-based compounds such as 2-[4-{(2-hydroxy-3-dodecyloxypropyl)oxy}-2-hydroxyphenyl]-4,6-bis(2,4-dimethylphenyl)-1,3,5-triazine, 2-[4-{(2-hydroxy-3-tridecyloxypropyl)oxy}-2-hydroxy phenyl]-4,6-bis(2,4-dimethylphenyl)-1,3,5-triazine, and 2-{4-(octyl-2-methylethanoate)oxy-2-hydroxyphenyl-4,6-{bis(2,4-dimethylphenyl)}-1,3,5-triazine; benzophenone-based compounds such as 2,4-dihydroxybenzophenone and 2-hydroxy-4-methoxybenzophenone; benzotriazole-based compounds such as 2-(2H-benzotriazol-2-yl)-4,6-bis(1-methyl-1-phenylethyl)phenol and 2-(2H-benzotriazol-2-yl)-6-(1-methyl-1-phenylethyl)-4-(1,1,3,3-tetramethylbutyl)phenol; phenyl benzoate-based compounds such as phenyl salicylate, p-tert-butylphenyl salicylate, and p-(1,1,3,3-tetramethylbutyl)phenyl salicylate; phenyl salicylates and phenyl salicylate-based compounds such as 3-hydroxyphenyl benzoate and phenylene-1,3-dibenzoate. Among these, triazine-based compounds are preferred from the viewpoint that the resin composition has satisfactory curability and a cured film having high surface hardness is obtained, and 2-[4-{(2-hydroxy-3-dodecyloxypropyl)oxy}-2-hydroxyphenyl]-4,6-bis(2,4-dimethylphenyl)-1,3,5-triazine and 2-[4-{(2-hydroxy-3-tridecyloxypropyl)oxy}-2-hydroxyphenyl]-4,6-bis(2,4-dimethylphenyl)-1,3,5-triazine are more preferred.

Regarding the component (e), two or more kinds of ultraviolet absorbers each having a molecular weight of 500 or more can also be used in combination. Particularly, from the viewpoint of scratch resistance of the cured film, it is preferable to use 2-[4-{(2-hydroxy-3-dodecyloxypropyl)oxy}-2-hydroxyphenyl]-4,6-bis(2,4-dimethylphenyl)-1,3,5-triazine and 2-[4-{(2-hydroxy-3-tridecyloxypropyl)oxy}-2-hydroxyphenyl]-4,6-bis(2,4-dimethylphenyl)-1,3,5-triazine in combination.

The mixing amount of the component (e) in the resin composition of the present invention is preferably 0.5 to 20 parts by mass relative to a total amount of 100 parts by mass of the radical polymerizable compounds. Furthermore, the lower limit of the range is more preferably 5 parts by mass or more, and the upper limit is more preferably 15 parts by mass or less. As the mixing amount of the component (e) is larger, weather resistance of the cured film is increased, and as the mixing amount of the component (e) is smaller, curability of the resin composition, and toughness, heat resistance and abrasion resistance of the cured film are enhanced.

<Component (f)>

It is preferable that the resin composition of the present invention further includes (f) a hindered amine-based photostabilizer. The component (f) is not particularly limited as long as it is a hindered amine-based photo stabilizer. Specific examples of the component (f) include the following compounds; piperidine derivatives such as bis(2,2,6,6-tetramethyl-4-piperidyl) sebacate, bis(1,2,2,6,6-pentamethyl-4-piperidyl) sebacate, bis(1-methoxy-2,2,6,6-tetramethyl-4-piperidyl) sebacate, bis(1-ethoxy-2,2,6,6-tetramethyl-4-piperidyl) sebacate, bis(1-propoxy-2,2,6,6-tetramethyl-4-piperidyl) sebacate, bis(1-butoxy-2,2,6,6-tetramethyl-4-piperidyl) sebacate, bis(1-pentyloxy-2,2,6,6-tetramethyl-4-piperidyl) sebacate, bis(1-hexyloxy-2,2,6,6-tetramethyl-4-piperidyl) sebacate, bis(1-heptyloxy-2,2,6,6-tetramethyl-4-piperidyl) sebacate, bis(1-octoxy-2,2,6,6-tetramethyl-4-piperidyl) sebacate, bis(1-nonyloxy-2,2,6,6-tetramethyl-4-piperidyl) sebacate, bis(1-decanyloxy-2,2,6,6-tetramethyl-4-piperidyl) sebacate, bis(1-dodecyloxy-2,2,6,6-tetramethyl-4-piperidyl) sebacate, bis(1,2,2,6,6-pentamethyl-4-piperidyl)-2-(4-methoxybenzylidene) malonate, tetrakis(2,2,6,6-tetramethyl-4-piperidyl) 1,2,3,4-butanetetracarboxylate, and tetrakis(1,2,2,6,6-pentamethyl-4-piperidyl) 1,2,3,4-butanetetracarboxylate; condensate between 1,2,3,4-butanetetracarboxylic acid, 1,2,2,6,6-pentamethyl-4-piperidinol, and β,β,β,β-tetramethyl-3,9-(2,4,8, 10-tetraoxaspiro[5,5])undecane)diethanol; condensate between 1,2,3,4-butanetetracarboxylic acid, 2,2,6,6-tetramethyl-4-piperidinol, and β,β,β,β-tetramethyl-3,9-(2,4,8,10-tetraoxaspiro[5,5])undecanediethanol; and amino ether group-containing compounds such as a reaction product between a diester compound of decanedicarboxylic acid and 2,2,6,6-tetramethyl-1-octoxy-4-piperidinol, 1,1-dimethylethyl hydroperoxide and octane (manufactured by BASF SE, trade name: TINUVIN 123). Among these, a piperidine derivative and an amino ether group-containing compound are preferred from the viewpoint of weather resistance of the cured film, and particularly, bis(1,2,2,6,6-pentamethyl-4-piperidyl) sebacate, and a reaction product between a diester compound of decanedicarboxylic acid and 2,2,6,6-tetramethyl-1-octoxy-4-piperklinol, 1,1-dimethylethyl hyperoxide and octane, are particularly preferred.

The mixing amount of the component (f) in the resin composition of the present invention is preferably 0.1 to 5 parts by mass relative to a total amount of 100 parts by mass of the radical polymerizable compounds. Furthermore, the lower limit of the range is more preferably 0.3 parts by mass or more, and the upper limit is more preferably 3 parts by mass or less. As the mixing amount of the component (f) is larger, weather resistance of the cured film is increased, and as the mixing amount of the component (f) is smaller, curability of the resin composition, and toughness, heat resistance and abrasion resistance of the cured film are enhanced.

Thus, components (a) to (f) have been described; however, if necessary, various additives such as an organic solvent, an oxidation inhibitor, a yellowing preventing agent, a blooming agent, a pigment, a leveling agent, a defoaming agent, a thickener, a precipitation preventing agent, an antistatic agent, and an antifogging agent may be further incorporated into the resin composition of the present invention.

It is preferable that the organic solvent is selected based on the kind of the base material. For example, in a case in which a polycarbonate is used as a base material, alcohol-based solvents such as isobutanol, and ester-based solvents such as normal butyl acetate may be used singly or in combination of two or more kinds thereof.

<Resin Molded Article>

When the resin composition of the present invention is applied on the surface of a resin molded article as a base material, and the coating film thus obtained is irradiated with an active energy beam to form a cured film, a resin molded article having excellent abrasion resistance and weather resistance can be obtained. In order to apply the resin composition on a base material, for example, methods such as brush coating, spray coating, dip coating, spin coating, curtain coating, and bar coating can be used. From the viewpoints of the coating properties of the resin composition, smootlmess of the coating film, and adhesiveness of the cured film to the resin molded article, it is preferable to apply a coating liquid obtained by adding an organic solvent to the resin composition. Furthermore, in order to decrease the viscosity, the resin composition may be warmed or diluted with a sub-critical fluid.

The coating film of the resin composition applied on a resin molded article is irradiated with an active energy beam and forms a cured film. The film thickness of the coating film that is formed on the resin molded article is preferably 1 to 50 µm, and more preferably 3 to 20 µm. The active energy beam is preferably ultraviolet radiation from the viewpoint of satisfactory curability of the coating film and productivity of the resin molded article. For the ultraviolet radiation source, a high pressure mercury lamp, a metal halide lamp or the like can be used. Regarding the ultraviolet radiation, it is preferable to radiate ultraviolet radiation having a wavelength of 100 to 400 nm at a dose of 10 to 5,000 mJ/cm$^2$. The atmosphere in which irradiation with the active energy beam is performed may be an air atmosphere, or may be an inert gas atmosphere such as nitrogen or argon.

The resin composition of the present invention can be used for the modification of the surfaces of various resin molded articles. Examples of the material for this resin molded article include various thermoplastic resins and thermosetting resins. Specific examples include a polymethyl methacrylic resin, a polycarbonate resin, a polyester resin, a polyester carbonate resin, a polystyrene resin, an acrylonitrile-butadiene-styrene resin (ABS resin), an acrylonitrile-styrene resin (AS resin), a polyamide resin, a polyallylate resin, a polymethacrylimide resin, and a polyallyl diglycol carbonate resin. Particularly, a polymethyl methacrylic resin, a polycarbonate resin, a polystyrene resin and a polymethacrylimide resin are required to have excellent transparency and improved abrasion resistance, it is very effective to apply the resin composition of the present invention. Meanwhile, resin molded articles are molded articles such as sheet-like molded articles, film-like molded articles, and various injection molded articles obtainable by molding these resins. The resin composition of the present invention is particular suitable for surface modification of resin molded articles such as headlamp lenses for automotive use that are exposed to a severe environment for a long time.

EXAMPLES

Hereinafter, the present invention will be described in more detail by way of Examples and Comparative Examples. Measurement and evaluation in the Examples were carried out by the following methods.

(1) Storage Stability

An uncured resin composition was introduced into a shaded glass bottle, and the glass bottle was tightly sealed and stored in an environment at −20° C. for one month. Thereafter, the temperature of the resin composition was returned to room temperature, and the state of the resin composition was visually observed. A case in which none of foreign materials, whitening and clouding was observed in the resin composition, was rated as "Good", and a case in which any one of these was observed was rated as "Poor".

(2) Abrasion Resistance

For a resin molded article having a cured film formed on the surface, the haze values before and after an abrasion resistance test were measured using a haze meter (HM-65W, manufactured by Murakami Color Research Laboratory Co., Ltd.), and the increment of the haze value was determined. Regarding the abrasion test, a cured film was subjected to an abrasion test of 100 rotations according to JIS K7204 "Testing method for abrasion resistance of plastics by abrasive wheels" using a ROTARY ABRASION TESTER (manufactured by Toyo Seiki Kogyo Co., Ltd.), using abrasive wheels CS-10F under a load of 4.9 N (500 gf). Abrasion resistance was judged by the following criteria.

"Excellent": The increment of the haze value is 0% or more and less than 5%.

"Good": The increment of the haze value is 5% or more and less than 10%.

"Poor": The increment of the haze value is 10% or more.

(3) Weather Resistance

A resin molded article having a cured film formed on the surface was subjected to a weather resistance test for 4,000 hours using a SUNSHINE CARBON WEATHER-O-METER (manufactured by Suga Test Instmments Co., Ltd., WELSUN-HC-B type) weather resistance testing machine, under the conditions of a black panel temperature of 63±3° C., and a cycle of raining for 12 minutes and radiation for 48 minutes. Subsequently, the following evaluations (A) to (C) were carried out.

(A) External Appearance

After the weather resistance test, the external appearance of the cured film was visually observed. A case in which none of cracking, whitening, clouding and peeling of the cured film occurred in the cured film was rated as "Good", and a case in which any one of these occurred was rated as "Poor".

(B) Transparency

The haze values before and after the weather resistance test of the resin molded article were measured using a haze meter (HM-65W, manufactured by Murakami Color Research Laboratory Co., Ltd.), and the increment of the haze value was calculated and judged by the following criteria.

"Excellent": The increment of the haze value is 0% or more and less than 2.0%.

"Good": The increment of the haze value is 2.0% or more and less than 5.0%.

"Poor": The increment of the haze value is 5.0% or more.

(C) Degree of Yellowing

The Yellow Index (YI) values before and after the weather resistance test of the resin molded article were measured using an ultraviolet/visible spectrophotometer (trade name: Instantaneous Multi-channel Photometer MCPD-3000, manufactured by Otsuka Electronics Co., Ltd.), and the increment of the YI value was calculated. Meanwhile, the YI value was determined by measuring the tristimulus values (X, Y, Z), and calculating the value using the following expression.

$$YI \text{ value} = 100 \times (1.28 \times X - 1.06 \times Z)/Y$$

The increment of the YI value was judged by the following criteria:

"Excellent": The increment of the YI value is 0 or more and less than 1.0.

"Good": The increment of the YI value is 1.0 or more and less than 5.0.

"Poor": The increment of the YI value is 5.0 or more.

(4) Heat Resistance

A heat resistance test was performed by placing a resin molded article having a cured film formed on the surface, in a dryer at 120° C. for 480 hours. The resin molded article was taken out from the dryer, and then the cured film was visually observed. A case in which cracks were not observed was rated as "Good", and a case in which cracks were observed was rated as "Poor".

Synthesis Example 1

Synthesis of UA1

Into a flask having a capacity of 5 liters and equipped with a dropping funnel having a function of thermal insulation, a reflux cooler, a stirring blade and a temperature sensor, 2 moles of dicyclohexylmethane-4,4-diisocyanate as a diisocyanate and 300 ppm of n-butyltin dilaurate were introduced, and the flask was warmed to 40° C. in a warm water bath. In a state in which the dropping funnel having a function of thermal insulation had been warmed to 40° C., 1 mole of a polycarbonate diol having a methylpentane structure (number average molecular weight 800, manufactured by Kuraray Co., Ltd., trade name: KURARAY POLYOL C770) as a diol was added dropwise into the flask over a period of 4 hours. The liquid inside the flask was stirred for 2 hours at 40° C., and the temperature was increased to 70° C. over a period of 1 hour. Subsequently, 2 moles of 2-hydroxyethyl acrylate as a mono(meth)acrylate containing a hydroxyl group was added dropwise into the flask over a period of 2 hours, and the liquid inside the flask was stirred for 2 hours. Thus, urethane acrylate UA1 (hereinafter, abbreviated to "UA1") was synthesized.

Synthesis Example 2

Synthesis of UA2

Urethane acrylate UA2 (hereinafter, abbreviated to "UA2") was synthesized in the same manner as in Synthesis Example 1, except that 5 moles of dicyclohexylmethane-4,4'-diisocyanate as a diisocyanate, 1 mole of N-methyl-N-(2-hydroxyethyl)-4-hydroxybutanamide and 1.5 moles of polytetramethylene glycol as diols, and 5.4 moles of 2-hydroxyethyl acrylate as a mono(meth)acrylate containing a hydroxyl group were used.

Example 1

An active energy beam-curable resin composition was produced based on the mixing ratio indicated in Table 1. This resin composition was applied by bar coating on a polycarbonate resin plate (manufactured by Saudi Basic Industries Corporation (SABIC), trade name: LEXAN LS-II) having a dimension of 253 mm in length, 125 mm in width, and 3 mm in thickness, such that the thickness of the film after being cured would be 10 μm. Subsequently, the resin plate having a coating film formed thereon was heat-treated at 60° C. for 3 minutes in an oven so as to volatilize the organic solvent. Subsequently, the coating film was irradiated with ultraviolet radiation having a wavelength of 340 nm to 380 nm using a high pressure mercury lamp at a cumulative amount of light of 3,000 mJ/cm$^2$, the coating film was cured thereby, and thus a cured film was obtained.

The resin molded article on which a cured film obtained in this manner was formed, was subjected to the various evaluations described above. The evaluation results are presented in Table 1. Furthermore, the numerical values in the columns for the resin composition in Table 1 and Table 2 indicate parts by mass. The abbreviations in Table 1 and Table 2 represent the compounds or marketed products indicated in Table 3.

Examples 2 to 10 and Comparative Examples 1 to 5

Resin compositions were produced using the materials and mixing ratios indicated in Table 1 or Table 2, and resin molded articles having cured films formed thereon under the same conditions as in Example 1 were obtained. The evaluation results are presented in Table 1 and Table 2.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Resin composition | Component (a) | DPCA-20 | 71 | 71 | 71 | 60 | 60 | 80 | 70 | 85 | 71 | 60 |
| | Component (b) | UA-1 | 29 | 29 | 24 | 40 | 35 | 20 | 10 | 15 | 29 | 10 |
| | Component (c) | TAIC | 0 | 0 | 5 | 0 | 5 | 0 | 0 | 0 | 0 | 30 |
| | Other component | TMPTA | 0 | 0 | 0 | 0 | 0 | 0 | 20 | 0 | 0 | 0 |
| | Component (d) | BNP | 1 | 1 | 1 | 1 | 1 | 1 | 1 | 1 | 1 | 1 |
| | | MPG | 1 | 1 | 1 | 1 | 1 | 1 | 1 | 1 | 1 | 1 |
| | | BDK | 1 | 1 | 1 | 1 | 1 | 1 | 1 | 1 | 1 | 1 |
| | Component (e) | HBPB | 0 | 0 | 0 | 0 | 0 | 0 | 0 | 0 | 10 | 0 |
| | | HHBT | 10 | 0 | 10 | 10 | 10 | 10 | 10 | 10 | 0 | 10 |
| | | OHBT | 0 | 10 | 0 | 0 | 0 | 0 | 0 | 0 | 0 | 0 |
| | Component (f) | LA63 | 0 | 0 | 0 | 0 | 0.5 | 0.5 | 0 | 0 | 0 | 0 |
| | | TINUVIN 123 | 0.5 | 0.5 | 0.5 | 0.5 | 0 | 0 | 0.5 | 0.5 | 0.5 | 0.5 |
| | Surface conditioning agent | BYK-333 | 1.3 | 1.3 | 1.3 | 1.3 | 1.3 | 1.3 | 1.3 | 1.3 | 1.3 | 1.3 |
| | Diluent solvent | PGM | 179 | 179 | 179 | 179 | 179 | 179 | 179 | 179 | 179 | 179 |
| | | ECA | 6.7 | 6.7 | 6.7 | 6.7 | 6.7 | 6.7 | 6.7 | 6.7 | 6.7 | 6.7 |
| Evaluation results | | Total | 300.5 | 300.5 | 300.5 | 300.5 | 300.5 | 300.5 | 300.5 | 300.5 | 300.5 | 300.5 |
| | (1) Storage stability | | Good | Good | Good | Good | Good | Good | Good | Good | Good | Poor |
| | (2) Abrasion resistance (increment of haze %) | | Excellent (3.6) | Excellent (3.5) | Excellent (2.5) | Good (5.8) | Good (5.4) | Excellent (2.1) | Excellent (1.8) | Excellent (2.0) | Excellent (3.4) | Excellent (2.0) |
| (3) Weather resistance | (A) External appearance | | Good | Good | Good | Good | Good | Good | Good | Good | Good | Good |
| | (B) Transparency (increment of haze %) | | Excellent (1.1) | Excellent (1.6) | Excellent (1.8) | Excellent (0.4) | Excellent (0.7) | Excellent (1.7) | Good (2.1) | Excellent (1.9) | Good (2.2) | Good (3.4) |
| | (C) Degree of yellowing (increment of YI) | | Excellent (0.7) | Excellent (0.6) | Excellent (0.7) | Excellent (0.5) | Excellent (0.5) | Excellent (0.7) | Excellent (0.8) | Excellent (0.8) | Good (2.0) | Good (1.8) |
| | (4) Heat resistance | | Good | Good | Good | Good | Good | Good | Good | Good | Good | Good |

TABLE 2

| | | | Comparative Example | | | | | |
|---|---|---|---|---|---|---|---|---|
| | | | 1 | 2 | 3 | 4 | 5 | 6 |
| Resin composition | Component (a) | DPCA-20 | 95 | 40 | 40 | 90 | 71 | 55 |
| | Component (b) | UA-1 | 5 | 40 | 60 | 5 | 0 | 35 |
| | Component (c) | TAIC | 0 | 0 | 0 | 5 | 0 | 10 |
| | Other component | UA-2 | 0 | 0 | 0 | 0 | 29 | 0 |
| | | TMPTA | 0 | 20 | 0 | 0 | 0 | 0 |
| | Component (d) | BNP | 1 | 1 | 1 | 1 | 1 | 1 |
| | | MPG | 1 | 1 | 1 | 1 | 1 | 1 |
| | | BDK | 1 | 1 | 1 | 1 | 1 | 1 |
| | Component (e) | HHBT | 10 | 10 | 10 | 10 | 10 | 10 |
| | | OHBT | 0 | 0 | 0 | 0 | 0 | 0 |
| | Component (f) | LA63 | 0 | 0 | 0 | 0 | 0 | 0 |
| | | TINUVIN 123 | 0.5 | 0.5 | 0.5 | 0.5 | 0.5 | 0.5 |
| | Surface conditioning agent | BYK-333 | 1.3 | 1.3 | 1.3 | 1.3 | 1.3 | 1.3 |
| | Diluent solvent | PGM | 179 | 179 | 179 | 179 | 179 | 179 |
| | | ECA | 6.7 | 6.7 | 6.7 | 6.7 | 6.7 | 6.7 |
| | | Total | 300.5 | 300.5 | 300.5 | 300.5 | 300.5 | 300.5 |
| Evaluation results | (1) Storage stability | | Good | Good | Good | Good | Poor | Poor |
| | (2) Abrasion resistance (increment of haze %) | | Excellent (1.6) | Poor (10.2) | Poor (12.1) | Excellent (1.4) | Good (5.1) | Good (9.2) |
| (3) Weather resistance | (A) External appearance | | Poor | Good | Good | Poor | Poor | Poor |
| | (B) Transparency (increment of haze %) | | Poor (8.9) | Excellent (0.6) | Excellent (0.4) | Poor (7.2) | Good (3.1) | Excellent (1.2) |
| | (C) Degree of yellowing (increment of YI) | | Poor (5.1) | Excellent (0.5) | Excellent (0.5) | Poor (5.2) | Good (1.8) | Excellent (0.8) |
| | (4) Heat resistance | | Poor | Good | Good | Poor | Good | Good |

TABLE 3

| Abbreviation | Compound or trade name |
|---|---|
| DPCA-20 | Dipentaerythritol hexaacrylate modified by two caprolactone molecules per molecule (manufactured by Nippon Kayaku Co., Ltd., trade name: KAYARAD DPCA20) |
| UA-1 | Urethane acrylate synthesized in Synthesis Example 1 |
| UA-2 | Urethane acrylate synthesized in Synthesis Example 2 |
| TAIC | Tris(2-acryloyloxyethyl) isocyanurate |
| TMPTA | Trimethylolpropane triacrylate |
| BNP | Benzophenone |
| MPG | Methylphenyl glyoxylate |
| BDK | Benzyl dimethyl ketal |
| HBPB | 2-(2-Hydroxy-5-tert-butylphenyl)benzotriazole (molecular weight 267) |
| HHBT | Mixture (molecular weight 647) of 2-[4-(2-hydroxy-3-dodecyloxypropyl) oxy-2-hydroxyphenyl]-4,6-[bis(2,4-dimethylphenyl)-1,3,5-triazine (molecular weight 640) (about 47%) and 2-[4-(2-hydroxy-3-tridecyloxypropyl)oxy-2-hydroxyphenyl]-4,6-[bis(2,4-dimethylphenyl)-1,3,5-triazine (molecular weight 653) (about 53%) {trade name: "TINUVIN 400" (BASF)} |
| OHBT | 2-[4-(Octyl-2-methylethanoate)oxy-2-hydroxyphenyl]-4,6-[bis(2,4-dimethylphenyl)-1,3,5-triazine [trade name: "TINUVIN 479" (BASF)] (molecular weight 677) |
| LA63 | Trade name: "ADEKASTAB LA-63P" (ADEKA Corp.) |
| TINUVIN 123 | Reaction product between decanedicarboxylic acid, a diester compound of 2,2,6,6-tetramethyl-1-octooxy-4-piperidinol, 1,1-dimethylethyl hydroperoxide, and octane {trade name: "TINUVIN 123" (BASF)} |
| BYK-333 | Silicon-based leveling agent (manufactured by BYK Chemie Japan, K.K., trade name: BYK-333) |
| PGM | 1-Methoxy-2-propanol |
| ECA | Ethylcarbitol acetate |

[Summary of Evaluation Results]

As shown in Table 1, since the resin compositions of Examples 1 to 9 have the mixing ratios of the components (a) to (c) in a predetermined range, the various evaluation results were satisfactory. The resin composition of Example 10 exhibited satisfactory abrasion resistance, weather resistance and heat resistance; however, since the content of the component (c) was large, storage stability of the coating material was poor.

As shown in Table 2, in the resin composition of Comparative Example 1, since the content of the component (a) was too large and the content of the component (b) was too small, weather resistance of the cured film was poor. In the resin composition of Comparative Example 2 and Comparative Example 3, since the content of the component (a) was too small, abrasion resistance of the cured films was poor. In the resin composition of Comparative Example 4, since the content of the component (b) was too small, weather resistance of the cured film was poor. Since the resin composition of Comparative Example 5 did not contain the component (b) but contained a urethane acrylate that did not correspond to the component (b) as a urethane (meth)acrylate, storage stability of the coating material was poor, and weather resistance of the cured film was also poor.

INDUSTRIAL APPLICABILITY

A cured film obtainable from the resin composition of the present invention is effective for enhancing the weather resistance and abrasion resistance of resin molded articles such as various lamp lenses, glazings, and covers for gauges for automotive use.

The invention claimed is:

1. An active energy beam-curable resin composition comprising radical polymerizable compounds and (d) a photopolymerizable initiator, wherein the radical polymerizable compounds comprising, based on a total amount of 100% by mass of the radical polymerizable compounds, 71% to 90% by mass of (a) a caprolactone-modified mono- or poly-pentaerythritol poly(meth)acrylate represented by the following formula (1); and 10% to 29% by mass of (b) a urethane (meth)acrylate synthesized from a polycarbonate polyol having a branched alkyl structure and having a number average molecular weight in the range of 500 to 1,000, a diisocyanate having an alicyclic structure, and a mono (meth)acrylate containing a hydroxyl group:

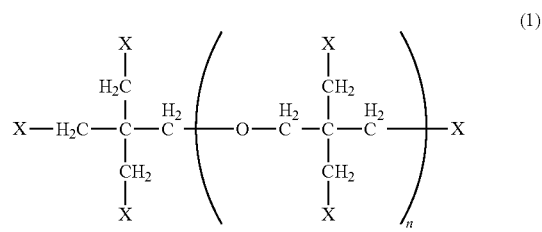

wherein in formula (1), "4+2n" units of X each independently represent a (meth)acryloyloxy group modified by caprolactone $(CH_2=CR-CO(O(CH_2)_5C=O)_y-O-)$, wherein R represents a hydrogen atom or a methyl group, and y represents an integer from 1 to 5; a (meth)acryloyloxy group $(CH_2=CR-COO-)$, wherein R represents a hydrogen atom or a methyl group; or a —OH group; at least one X represents a (meth)acryloyloxy group modified by caprolactone, each of at least two X's represents a (meth)acryloyloxy group, while each of the other X's represents a —OH group; and n represents an integer from 0 to 4% by mass or less of (c) a radical polymerizable monomer other than (a) and (b), the radical polymerizable monomer (c) being crystallizable at a temperature of 25° C.

2. The active energy beam-curable resin composition according to claim 1, wherein the active energy beam-curable resin composition further comprises (e) an ultraviolet absorber in an amount of 0.5 to 20 parts by mass relative to a total amount of 100 parts by mass of the radical polymerizable compounds.

3. The active energy beam-curable resin composition according to claim 1, wherein the active energy beam-curable resin composition further comprises (e) an ultraviolet absorber in an amount of 0.5 to 20 parts by mass relative to a total amount of 100 parts by mass of the radical polymerizable compounds.

4. The active energy beam-curable resin composition according to claim 2, wherein the (e) ultraviolet absorber has a molecular weight of 500 or more.

5. The active energy beam-curable resin composition according to claim 3, wherein the (e) ultraviolet absorber has a molecular weight of 500 or more.

6. The active energy beam-curable resin composition according to claim 2, wherein the (e) ultraviolet absorber is a combination of two or more kinds of ultraviolet absorbers each having a molecular weight of 500 or more.

7. The active energy beam-curable resin composition according to claim 3, wherein the (e) ultraviolet absorber is a combination of two or more kinds of ultraviolet absorbers each having a molecular weight of 500 or more.

8. The active energy beam-curable resin composition according to claim 1, wherein the active energy beam-curable resin composition further comprises (f) a hindered amine-based photostabilizer in an amount of 0.1 to 5 parts by mass relative to a total amount of 100 parts by mass of the radical polymerizable compounds.

9. A resin molded article having on a surface of the resin molded article, a cured film obtained by curing the active energy beam-curable resin composition according to claim 1.

10. A resin molded article having on a surface of the resin molded article, a cured film obtained by curing the active energy beam-curable resin composition according to claim 8.

11. The resin molded article according to claim 9, wherein the resin molded article is a headlamp lens for automotive use.

12. The resin molded article according to claim 10, wherein the resin molded article is a headlamp lens for automotive use.

13. A method for producing the resin molded article according to claim 9, the method comprising applying the active energy beam-curable resin composition on the surface of the resin molded article, and irradiating the coating film thus obtained with an active energy beam.

14. A method for producing the resin molded article according to claim 11, the method comprising applying the active energy beam-curable resin composition on the surface of a resin molded article, and irradiating a resultant coating film with an active energy beam.

15. A method for producing the resin molded article according to claim 10, the method comprising applying the active energy beam-curable resin composition on the surface of a resin molded article, and irradiating a resultant coating film with an active energy beam.

16. A method for producing the resin molded article according to claim 12, the method comprising applying the active energy beam-curable resin composition on the surface of a resin molded article, and irradiating a resultant coating film with an active energy beam.

* * * * *